(12) United States Patent
Nakahara et al.

(10) Patent No.: US 9,616,405 B2
(45) Date of Patent: Apr. 11, 2017

(54) STEAM STRIPPING APPARATUS AND STEAM-STRIPPING FINISHING METHOD USING SAME

(71) Applicant: Asahi Kasei Chemicals Corporation, Tokyo (JP)

(72) Inventors: Tatsuto Nakahara, Tokyo (JP); Hiroshi Nakano, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 30 days.

(21) Appl. No.: 14/359,603

(22) PCT Filed: Nov. 27, 2012

(86) PCT No.: PCT/JP2012/080615
§ 371 (c)(1),
(2) Date: May 21, 2014

(87) PCT Pub. No.: WO2013/080969
PCT Pub. Date: Jun. 6, 2013

(65) Prior Publication Data
US 2015/0259501 A1 Sep. 17, 2015

(30) Foreign Application Priority Data
Nov. 28, 2011 (JP) ................................. 2011-259135

(51) Int. Cl.
*B02C 17/16* (2006.01)
*B01J 19/00* (2006.01)
(Continued)

(52) U.S. Cl.
CPC ............ *B01J 19/006* (2013.01); *B01D 1/225* (2013.01); *B01D 3/00* (2013.01); *B01D 19/001* (2013.01);
(Continued)

(58) Field of Classification Search
CPC ...... B01F 7/18; B01F 7/1675; B01F 7/00241; B01F 7/00233; B02C 17/163; B02C 17/16; B02C 17/1815
(Continued)

(56) References Cited

U.S. PATENT DOCUMENTS 2,082,796 A * 6/1937 Gaertner ............... B01F 7/1675
366/307
2,240,841 A * 5/1941 Flynn .................... B01F 7/0025
241/276
(Continued)

FOREIGN PATENT DOCUMENTS

JP S57-053363 B 11/1982
JP S60-010041 B 3/1985
(Continued)

OTHER PUBLICATIONS

European Search Report issued in corresponding European Patent Application No. 12853241.3 dated Sep. 4, 2014.
(Continued)

*Primary Examiner* — Faye Francis
(74) *Attorney, Agent, or Firm* — Morgan, Lewis & Bockius LLP

(57) ABSTRACT

A steam stripping apparatus is provided that prevents adherence of crumbs to an inner wall of a crumbing tank, pipe blockages caused by reaggregated large particle size crumbs, clogging of a screen by small particle size crumbs, and slipping in an extruder, and which can operate over a long period of time. The crumbing tank includes a stir shaft and an impeller, and also has a baffle plate on an inner wall face. The impeller has a knife blade. The baffle plate has an approximately triangular cross-sectional shape having, on a cross section in a cylindrical lateral direction of the crumbing tank, a side face on each of an upstream side and a downstream side with respect to a flow direction of a fluid,
(Continued)

and in which the upstream-side side face and the downstream-side side face meet to form an intersection point.

8 Claims, 6 Drawing Sheets

(51) Int. Cl.

| | |
|---|---|
| *B02C 17/18* | (2006.01) |
| *B01D 3/00* | (2006.01) |
| *C08C 2/06* | (2006.01) |
| *B01D 1/22* | (2006.01) |
| *B01D 19/00* | (2006.01) |
| *B01F 7/00* | (2006.01) |
| *B01F 7/16* | (2006.01) |
| *B01F 7/18* | (2006.01) |
| *C08F 6/10* | (2006.01) |
| *C08C 1/14* | (2006.01) |
| *B01J 19/18* | (2006.01) |
| *B01F 7/20* | (2006.01) |

(52) U.S. Cl.
CPC ........ *B01F 7/00616* (2013.01); *B01F 7/1625* (2013.01); *B01F 7/1675* (2013.01); *B01F 7/18* (2013.01); *B01F 7/20* (2013.01); *B01J 19/0066* (2013.01); *B01J 19/18* (2013.01); *B02C 17/16* (2013.01); *B02C 17/163* (2013.01); *B02C 17/1815* (2013.01); *C08C 1/14* (2013.01); *C08C 2/06* (2013.01); *C08F 6/10* (2013.01); *B01J 2219/0077* (2013.01); *B01J 2219/1943* (2013.01); *C08J 2309/06* (2013.01)

(58) Field of Classification Search
USPC ............. 241/277, 65, 46.017, 46.11, 165.5; 366/307
See application file for complete search history.

(56) References Cited

U.S. PATENT DOCUMENTS

| | | | | |
|---|---|---|---|---|
| 2,464,588 A | * | 3/1949 | Knudsen | B01F 7/00466 241/146 |
| 2,973,153 A | * | 2/1961 | Rich | D21B 1/345 209/380 |
| 3,182,633 A | * | 5/1965 | Lodige | B01F 7/048 118/417 |
| 3,404,870 A | * | 10/1968 | Multer | B01F 7/0025 366/307 |
| 4,310,124 A | * | 1/1982 | Schwing | B02C 18/08 241/258 |
| 4,421,414 A | * | 12/1983 | Holupko | B01F 3/04531 241/46.17 |
| 4,535,943 A | * | 8/1985 | Couture | D21B 1/347 162/261 |
| 4,593,861 A | * | 6/1986 | Blakley | D21B 1/345 241/246 |
| 4,612,088 A | * | 9/1986 | Nardi | B01J 19/1875 162/235 |
| 4,614,439 A | * | 9/1986 | Brunt | B28C 5/40 366/154.2 |
| 4,725,007 A | * | 2/1988 | Chupka | D21B 1/347 162/261 |
| 5,328,105 A | * | 7/1994 | Sims | F23G 5/02 241/101.74 |
| 5,660,468 A | * | 8/1997 | Okajima | B01F 7/048 366/286 |
| 5,964,527 A | * | 10/1999 | Decnop | B01F 7/00908 366/172.1 |
| 6,786,631 B2 | * | 9/2004 | Lipp | B01F 7/00158 366/322 |
| 6,960,014 B2 | * | 11/2005 | Kongstad | A23G 1/18 366/147 |
| 7,168,641 B2 | * | 1/2007 | Filgueiras | B03B 5/00 241/43 |
| 7,607,821 B2 | * | 10/2009 | Schmidt | B01F 15/00837 366/147 |
| 2005/0267288 A1 | | 12/2005 | Yamaguchi et al. | |
| 2006/0241280 A1 | | 10/2006 | Katayama et al. | |

FOREIGN PATENT DOCUMENTS

| | | |
|---|---|---|
| JP | 2001-261713 A | 9/2001 |
| JP | 2005-029765 A | 2/2005 |
| WO | 2004/007567 A1 | 1/2004 |

OTHER PUBLICATIONS

International Search Report issued in corresponding International Patent Application No. PCT/JP2012/080615 dated Feb. 5, 2013.

* cited by examiner

STEAM STRIPPING APPARATUS AND STEAM-STRIPPING FINISHING METHOD USING SAME

TECHNICAL FIELD

The present invention relates to a steam stripping apparatus that recovers a rubber-like polymer from a rubber-like polymer solution or slurry, and a steam-stripping finishing method that uses the steam stripping apparatus.

BACKGROUND ART

A steam-stripping finishing method is widely used conventionally as a method for recovering a rubber-like polymer from a rubber-like polymer solution or a slurry containing the rubber-like polymer.

The steam-stripping finishing method is generally performed using a steam stripping apparatus that is equipped with at least one cylindrical upright crumbing tank. However, a problem with the steam-stripping finishing method is that, in a first tank in which the solvent content in crumbs of the rubber-like polymer that is being handled is relatively large, crumbs are liable to adhere to a wall inside the crumbing tank, or large particle size crumbs are generated by reaggregation of crumbs and there is a risk that the large particle size crumbs will cause pipe blockages.

Various methods have already been proposed to control the particle size of crumbs in order to prevent the occurrence of such problems in crumbing tanks.

For example, methods that use a specific dispersing agent (for example, see Patent Literature 1 and 2) and methods that use a specific impeller (for example, see Patent Literature 3) are available.

CITATION LIST

Patent Literature

Patent Literature 1: Japanese Patent Publication No. 57-053363
Patent Literature 2: Japanese Patent Publication No. 60-010041
Patent Literature 3: Japanese Patent Laid-Open No. 2005-029765

SUMMARY OF INVENTION

Technical Problem

However, a problem with the methods that use the dispersing agent is that, after crumbs are obtained, the crumbs are liable to slip in an extruder that is used in the next step and, consequently, the processing speed is liable to decrease as the result of biting failures.

On the other hand, a problem with the method that uses the specific impeller is that some crumbs are generated that have an excessively small particle size and, consequently, clogging of a screen is liable to occur when performing screening in a subsequent step.

Therefore, an object of the present invention is to provide a steam stripping apparatus that recovers a rubber-like polymer from a rubber-like polymer solution or slurry, and a steam-stripping finishing method that uses the steam stripping apparatus, which prevent adherence of crumbs to the inner wall of a crumbing tank, prevent pipe blockages caused by large particle size crumbs that are generated by reaggregation of crumbs, and also prevent clogging of a screen in a subsequent step that is caused by some small particle size crumbs, and which enable operation over a long period of time, and furthermore, by not relying on a dispersing agent, can also effectively prevent a decrease in processing speeds due to the occurrence of biting failures that are caused by slipping of crumbs in an extruder in a subsequent step, and can thus improve the overall yield of the polymer.

Solution to Problem

The present inventors et al. have conducted concentrated studies to solve the above described problems, and found that the above described object can be accomplished by employing a method that crushes and disperses crumbs by means of a particular impeller and also disposing a baffle plate having an approximately triangular cross-sectional shape on an inner wall face of the crumbing tank, and thereby completed the present invention.

That is, the present invention is as follows.

[1]

A steam stripping apparatus comprising at least one cylindrical upright crumbing tank which desolvates a rubber-like polymer solution or slurry by means of steam, and which recovers a rubber-like polymer, wherein:
at least a first tank among the crumbing tanks comprises: a stir shaft which extends in a cylindrical upright direction, and which rotates in an axial direction; and an impeller that extends from a center of the stir shaft in a direction of an inner wall face of the crumbing tank;
the impeller includes a knife blade;
the knife blade has a cutting edge with an edge angle between 10 and 60 degrees that faces in a rotational direction of the stir;
a ratio of a length of twice a distance between a tip of the cutting edge of the knife blade and a center of a cross section of the stir shaft that is on a same plane as the knife blade with respect to an inside diameter of the crumbing tank is between 30 and 70%;
at least the first tank among the crumbing tanks comprises a baffle plate arranged on an inner wall face of the crumbing tank;
the baffle plate has an approximately triangular cross-sectional shape having, on a cross section in a cylindrical lateral direction of the crumbing tank, a side face on each of an upstream side and a downstream side with respect to a flow direction of a fluid inside the crumbing tank, and in which the upstream-side side face and the downstream-side side face meet to form an intersection point;
an angle of the baffle plate that is formed by a line segment of the upstream-side side face on a cross section in a cylindrical lateral direction of the crumbing tank and a line segment that connects to an intersection point from the center of the stir shaft is between 30 and 75 degrees; and
an angle of the baffle plate formed by a line segment of the downstream-side side face on a cross section in a cylindrical lateral direction of the crumbing tank and the line segment that connects to an intersection point from the center of the stir shaft is between 30 and 75 degrees.

[2]

A steam stripping apparatus comprising at least one cylindrical upright crumbing tank which desolvates a rubber-like polymer solution or slurry by means of steam, and which recovers a rubber-like polymer, wherein:
at least a first tank among the crumbing tanks comprises: a stir shaft which extends in a cylindrical upright direction, and which rotates in an axial direction; and an impeller that extends from a center of the stir shaft in a direction of an inner wall face of the crumbing tank;

at least the first tank among the crumbing tanks comprises a baffle plate arranged on an inner wall face of the crumbing tank;

the baffle plate has an approximately triangular cross-sectional shape having, on a cross section in a cylindrical lateral direction of the crumbing tank, a side face on each of an upstream side and a downstream side with respect to a flow direction of a fluid inside the crumbing tank, and in which the upstream-side side face and the downstream-side side face meet to form an intersection point;

an angle of the baffle plate that is formed by a line segment of the upstream-side side face on a cross section in a cylindrical lateral direction of the crumbing tank and a line segment that connects to an intersection point from the center of the stir shaft is between 30 and 75 degrees; and an angle of the baffle plate formed by a line segment of the downstream-side side face on a cross section in a cylindrical lateral direction of the crumbing tank and the line segment that connects to an intersection point from the center of the stir shaft is between 30 and 75 degrees.

[3]

The steam stripping apparatus according to item [1] or [2] above, wherein a sum total of cross-sectional areas when the baffle plate is cut at a cross section including the baffle plate and the stir shaft along a direction of the stir shaft is between 1 and 20% relative to a cross-sectional area in an aqueous phase of the crumbing tank when cut at the cross section.

[4]

A steam-stripping finishing method that desolvates a rubber-like polymer solution or slurry by means of steam and recovers a rubber-like polymer, wherein:

the method uses a steam stripping apparatus according to any one of claims 1 to 3, and in at least a first tank among the crumbing tanks, a stir factor defined by $nD^2$ is a value between 1 and 50. (wherein n represents a number of rotations (1/sec) of the impeller, and D represents a diameter (m) of the impeller)

Advantageous Effects of Invention

According to the steam stripping apparatus of the present invention, adherence of crumbs, pipe blockages and the clogging of screens in a crumbing tank as well as the occurrence of slipping in an extruder can be effectively prevented, stable operation over a long period of time is enabled, and a rubber-like polymer can be recovered at a high yield.

DESCRIPTION OF EMBODIMENTS

Figure 1:
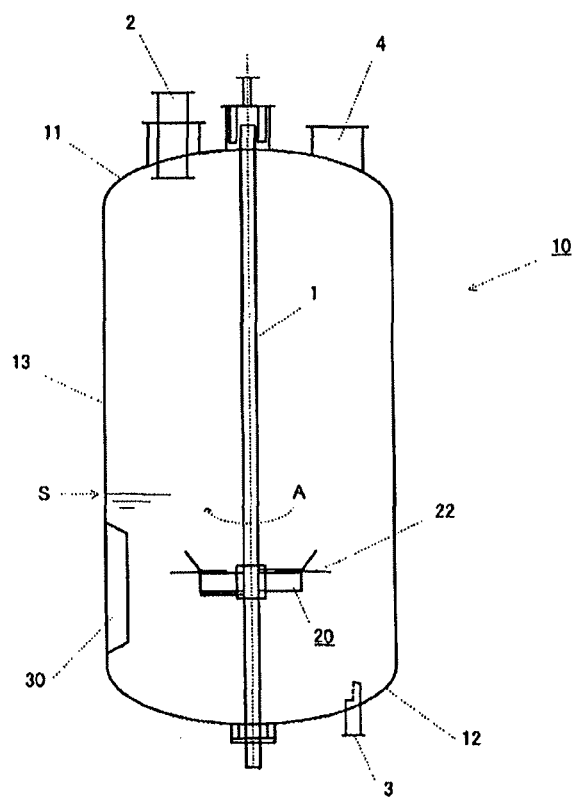
FIG. 1 shows a schematic cross-sectional view of one example of a steam stripping apparatus according to the present embodiment.

A mode for carrying out the present invention (hereinafter referred to as "the present embodiment") will be described in detail below with reference to the drawings. The present invention is not limited to the following description, and various modifications can be made to the present invention without departing from the spirit thereof.

In the drawings, a positional relationship, such as top, bottom, left, and right, is based on the positional relationship shown in the drawings, unless otherwise specified. Further, a dimensional ratio in the drawings is not limited to the ratio shown.

In addition, in the present specification, it is assumed that terms to which the word "approximately" is added are terms which indicate the meaning of the term without the word "approximately" within the range of the common general technical knowledge of one skilled in the art, and also include the meaning itself without the word "approximately".

A steam stripping apparatus according to the present embodiment is described hereunder.

Note that, in some cases the steam stripping apparatus according to the present embodiment has a configuration in which an impeller that is described later includes a knife blade, and in some cases the steam stripping apparatus of the present embodiment has a configuration in which the impeller does not include a knife blade. Hereunder, these configurations are described as a first aspect and a second aspect, respectively.

{First Aspect of Steam Stripping Apparatus}

A first aspect of the steam stripping apparatus according to the present embodiment is:

a steam stripping apparatus equipped with at least one cylindrical upright crumbing tank which desolvates a rubber-like polymer solution or slurry by means of steam, and which recovers a rubber-like polymer, in which:

at least a first tank among the crumbing tanks is equipped with a stir shaft which extends in a cylindrical upright direction, and which rotates in an axial direction, and an impeller that extends from a center of the stir shaft in a direction of an inner wall face of the crumbing tank;

the impeller includes a knife blade;

the knife blade has a cutting edge with an edge angle between 10 and 60 degrees that faces in a rotational direction of the stir;

a ratio of a length of twice a distance between a tip of the cutting edge of the knife blade and a center of a cross section of the stir shaft that is on a same plane as the knife blade with respect to an inside diameter of the crumbing tank is between 30 and 70%;

at least the first tank among the crumbing tanks is equipped with a baffle plate arranged on an inner wall face of the crumbing tank;

the baffle plate has an approximately triangular cross-sectional shape having, on a cross section in a cylindrical lateral direction of the crumbing tank, a side face on each of an upstream side and a downstream side with respect to a flow direction of a fluid inside the crumbing tank, and in which the upstream-side side face and the downstream-side side face meet to form an intersection point;

an angle of the baffle plate that is formed by a line segment of the upstream-side side face on a cross section in a cylindrical lateral direction of the crumbing tank and a line segment that connects to the intersection point from the center of the stir shaft is between 30 and 75 degrees; and an angle of the baffle plate formed by a line segment of the downstream-side side face on a cross section in a cylindrical lateral direction of the crumbing tank and the line segment that connects to an intersection point from the center of the stir shaft is between 30 and 75 degrees.

FIG. 1 shows a schematic cross-sectional view of principal parts of a steam stripping apparatus 10 according to the first aspect of the present embodiment.

The steam stripping apparatus 10 according to the first aspect of the present embodiment is equipped with at least one cylindrical upright crumbing tank 13 that recovers rubber-like polymer from a rubber-like polymer solution or slurry that is described later.

The steam stripping apparatus 10 includes a supply port 2 for supplying a rubber-like polymer solution or slurry into the crumbing tank 13, a steam supply port 3 that is connected to a predetermined sparger that supplies steam, and piping 4 that discharges a volatile gas that was separated from crumbs.

The steam stripping apparatus 10 according to the first aspect of the present embodiment may be equipped with one or a plurality of the cylindrical upright crumbing tanks 13 shown in FIG. 1. In a case where the steam stripping apparatus 10 is equipped with a plurality of the crumbing tanks 13, at least a first tank of the plurality of the crumbing tanks 13, that is, a crumbing tank into which a rubber-like polymer solution or slurry is supplied first, is equipped with a stir shaft 1 which extends in a cylindrical upright direction, and which rotates in an axial direction, that is, the direction of an arrow A in FIG. 1, and an impeller 20 that extends from the center of the stir shaft 1 in the direction of an inner wall face of the crumbing tank 13. The impeller 20 includes a knife blade 22 that is described later.

(Crumbing Tank)

The crumbing tank 13 includes a cylindrical upright side-face portion, a top face portion 11, and a bottom face portion 12. The top face portion 11 and the bottom face portion 12 may be end plates, respectively.

In a case where the top face portion 11 and the bottom face portion 12 are end plates, the top face portion 11 and the bottom face portion 12 may be any of a flat end plate, a dish-shaped end plate, a semi-ellipsoidal end plate or the like.

The inside diameter of the crumbing tank 13 is preferably between 1.5 and 5 m, and more preferably between 2 and 4 m. The height of the crumbing tank 13 is preferably between 2 and 8 m, and more preferably between 3 and 6 m.

The internal volume of the crumbing tank 13 is preferably between 10 and 60 $m^3$, and more preferably between 20 and 45 $m^3$.

Note that the height of the crumbing tank 13 is a height obtained by adding the height of the side face portion of the crumbing tank and the respective cross-sectional heights of the top face portion 11 and the bottom face portion 12, that is, heights of spaces that the top face portion 11 and the bottom face portion 12 which form curved surfaces occupy in a direction parallel to the stir shaft 1.

(Impeller)

An impeller 20 is provided on the stir shaft 1. The impeller 20 extends in an approximately horizontal direction from the center of the stir shaft 1 in the direction of the inner wall face of the crumbing tank 13, and rotates in accordance with rotation of the stir shaft 1.

Figure 2:
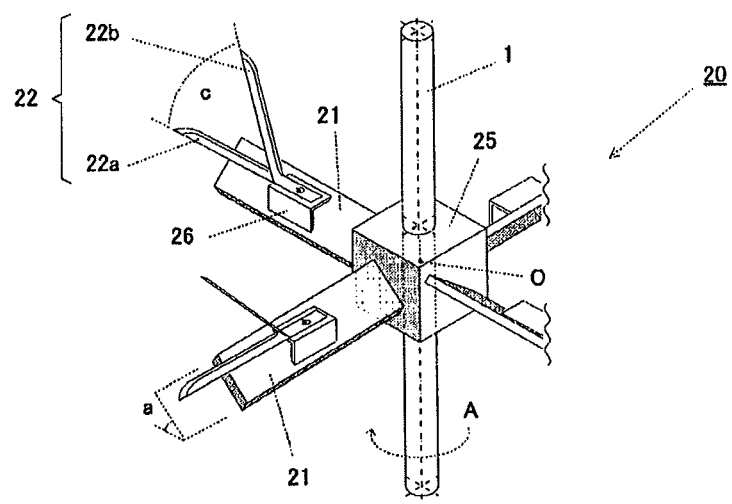
FIG. 2 shows a schematic perspective view of principal parts of one example of an impeller equipped with a knife blade and a turbine blade.

A schematic perspective view of principal parts of one example of the impeller 20 is shown in FIG. 2.

The impeller 20 shown in FIG. 2 includes, on a support portion 25 that is attached to the stir shaft 1, tabular paddle blades 21 that are arranged so as to incline at a predetermined angle a relative to a cross section in a perpendicular direction to a cylindrical axis direction of the crumbing tank. From the viewpoint of the fluid stirring efficiency, preferably the attachment angle a of the paddle blades 21 is between 90 and 15 degrees, more preferably between 75 and 25 degrees, and further preferably between 65 and 35 degrees.

(Knife Blade)

In at least a first tank among crumbing tanks constituting the steam stripping apparatus according to the present embodiment, since a solvent content in crumbs of rubber-like polymer that is obtained is comparatively large, generally crumbs are liable to adhere to an inner wall face inside the crumbing tank, and furthermore, large particle size crumbs are generated due to reaggregation of crumbs, and such large particle size crumbs are liable to cause blockages in the piping. In consideration of these points, in at least the first tank among the crumbing tanks in the steam stripping apparatus according to the first aspect of the present embodiment, the impeller 20 includes the knife blade 22.

Herein, the term "knife blade 22" refers to a part at which an impeller is formed in a knife shape, and is arranged so that the cutting edge of the knife is oriented toward the side of a rotational direction A in FIG. 1.

When the steam stripping apparatus 10 of the first aspect includes a plurality of crumbing tanks, a knife blade as an impeller may also be provided in crumbing tanks that are second and subsequent tanks, and not only in the crumbing tank that is the first tank.

On the impeller 20 shown in FIG. 2, the knife blades 22 are attached through predetermined attachment members 26 onto a face of the respective paddle blades 21 that are inclined at the predetermined angle a relative to a horizontal cross-section that is perpendicular to the stir shaft 1 of the crumbing tank 13.

The knife blades 22 may be attached singularly to each paddle blade 21 or a plurality of the knife blades 22 may be attached to each paddle blade 21.

Note that in a case of attaching a plurality of the knife blades 22 to a single paddle blade 21, as shown in FIG. 2, it is preferable to provide a knife blade 22a that extends in a horizontal cross-sectional direction that is perpendicular to the stir shaft 1 of the crumbing tank, that is, in a horizontal direction relative to the plane of rotation, and a knife blade 22b that extends in a diagonally upward direction. As a result, an effect of efficiently chopping large particle size crumbs is obtained.

Figure 3:
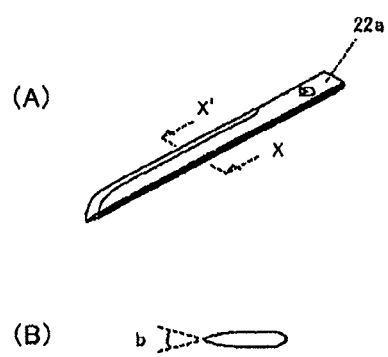
FIG. 3(A) shows a schematic perspective view of a knife blade that extends in a horizontal direction relative to a plane of rotation.
FIG. 3(B) shows an explanatory view of an edge angle of the knife blade.

FIG. 3(A) shows a perspective view of the knife blade 22a that extends in the horizontal direction relative to the plane of rotation. FIG. 3(B) shows an explanatory view of an edge angle of the knife blade 22a, that is a cross-sectional view of the knife blade 22a taken along a line segment X-X' in FIG. 3(A).

An edge angle b of the cutting edge of the knife blade shown in FIG. 3(B) is formed as an angle between 10 and 60 degrees, and preferably is between 20 and 45 degrees, and more preferably is between 25 and 40 degrees.

By forming the edge angle b of the knife blade to be the above described angle, large particle size crumbs produced by reaggregation of crumbs are effectively chopped and dispersed by the knife blade 22a. Further, by forming the edge angle b to be within the above described range, the balance between the cutting function and strength of the knife blade is favorable from a practical viewpoint.

Figure 4:
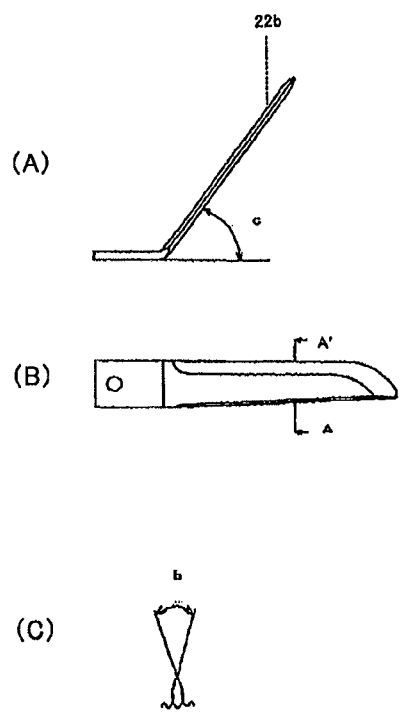
FIG. 4(A) shows a schematic side view of a knife blade that extends in a diagonally upward direction relative to a plane of rotation.
FIG. 4(B) shows a schematic top view of the knife blade that extends in the diagonally upward direction relative to the plane of rotation.
FIG. 4(C) shows an explanatory view of an edge angle of the knife blade that extends in the diagonally upward direction relative to the plane of rotation.

FIG. 4(A) shows a side view of the knife blade 22b that extends in a diagonally upward direction relative to the plane of rotation, and FIG. 4(B) shows a top view of the knife blade 22b that extends in a diagonally upward direction relative to the plane of rotation.

From the viewpoint of efficiently chopping large particle size crumbs, a rising angle c of the knife blade 22b is preferably between 80 and 30 degrees, more preferably between 70 and 40 degrees, and further preferably between 65 and 45 degrees.

One knife blade 22b may be arranged on each paddle blade 21, or a plurality of the knife blades 22b may be arranged on each paddle blade 21.

FIG. 4(C) shows an explanatory view of an edge angle of the knife blade 22b, that is a cross-sectional view of a tip of the knife blade 22b taken along a line segment A-A' in FIG. 4(B).

An edge angle b of the cutting edge of the knife blade 22b shown in FIG. 4(C) is formed as an angle that is between 10 and 60 degrees, and preferably is between 20 and 45 degrees, and more preferably is between 25 and 40 degrees.

By forming the edge angle b of the knife blade 22b to be the above described angle, large particle size crumbs produced by reaggregation of crumbs are effectively chopped and dispersed by the knife blade 22b. Further, by forming the edge angle b to be within the above described range, the balance between the cutting function and strength of the knife blade is favorable from a practical viewpoint.

In the steam stripping apparatus 10 according to the first aspect of the present embodiment, as shown in FIG. 2, the impeller 20 has a shape that extends and spreads out radially in the direction of the inner wall of the crumbing tank 13. Tip portions of the impeller 20 are the tips of the knife blades 22a that extend in the horizontal direction relative to the plane of rotation.

A ratio of a length that is twice the length of a line segment connecting the tip of the knife blade 22a and a center O of the stir shaft 1 that is coplanar with the plane of rotation of the knife blade 22a with respect to the inside diameter of the body portion of the crumbing tank is between 30 and 70%. Preferably, the ratio is between 40 and 60%, and more preferably is between 45 and 55%.

By setting the length of the knife blade 22a to be within the above described range, large particle size crumbs produced by reaggregation of crumbs can be effectively chopped and dispersed.

Preferably, the thickness of the knife blade 22 at a cross section cut along a direction perpendicular to the surface of the knife blade is between 5 and 20 mm.

When the thickness of the knife blade 22 is within the above described range, chopping and dispersal of crumbs can be effectively performed, and the strength of the knife blade can be made a sufficient strength from a practical viewpoint.

In the steam stripping apparatus according to the first aspect of the present embodiment, preferably a plurality of two or more of the knife blades 22 are arranged at positions that are rotationally symmetric with respect to the stir shaft, and more preferably between 4 and 64 of the knife blades 22 are arranged, and further preferably between 6 and 32 of the knife blades 22 are arranged.

The cutting edges of the knife blades 22 can be arranged to face in various directions relative to the rotational direction A, such as a horizontal direction, a diagonally upward direction, and a diagonally downward direction.

As shown in FIG. 1, in the crumbing tank 13, when the height of a liquid surface S of a rubber-like polymer solution or slurry that is the object of steam stripping is taken as 100%, preferably the impeller 20 is arranged at a height that corresponds to between 35 and 80% of the height of the liquid surface S, and more preferably is arranged at a height that corresponds to between 40 and 75% of the height of the liquid surface S.

By regulating the height of the liquid surface S and the height of the impeller 20 in the manner described above, when the impeller 20 is rotated the knife blades 22 can come in contact with the large particle size crumbs and effectively chop and disperse the crumbs.

(Baffle Plate)

As shown in FIG. 1, at least the first tank among the crumbing tanks 13 constituting the steam stripping apparatus according to the present embodiment is equipped with baffle plates 30 that are provided on an inner wall face of the crumbing tank 13 and that face the flow direction of the rubber-like polymer solution or slurry.

As for the baffle plates 30, a sum total of the cross-sectional areas of the baffle plates when the crumbing tank is cut at a cross section including the baffle plates 30 and the stir shaft 1 along the direction of the stir shaft 1 (hereunder, referred to simply as "sum total of the cross-sectional areas of the baffle plates") is preferably between 1 and 20%, more preferably between 2 and 15%, and further preferably between 3 and 10%, relative to a cross-sectional area in an aqueous phase of the crumbing tank when the crumbing tank is cut at the cross section (hereunder, referred to as "cross-sectional area in the aqueous phase of the crumbing tank").

Note that the term "sum total of the cross-sectional areas of the baffle plates 30" refers to the total cross-sectional area of the baffle plates that is a value obtained by multiplying the cross-sectional area of one baffle plate in an aqueous phase by the number of baffle plates. Further, in a case where there are differences in the sizes of the baffle plates, the term "sum total of the cross-sectional areas of the baffle plates 30" refers to the sum total of the cross-sectional areas thereof.

Further, the term "cross-sectional area in the aqueous phase of the crumbing tank" refers to the sum total of a cross-sectional area of the aqueous phase when the crumbing tank is cut at a cross section that includes the stir shaft of the crumbing tank, the cross-sectional area of the stir shaft and the impeller, and the cross-sectional area of the baffle plates at the specified cross section.

By setting the ratio of the cross-sectional area of the baffle plates 30 based on the cross-sectional area including the stir shaft 1 of the crumbing tank 13 to the above described numerical value, uniform stir can be performed overall, including upstream and downstream, the particle sizes of crumbs can be made uniform, and generation of crumbs that have an excessively small particle size can be suppressed.

The above described baffle plate 30 is a so-called "triangular baffle plate" (in the present specification, in some cases the baffle plate 30 is referred to as "triangular baffle plate 30") that has a cross-sectional shape that is approximately triangular when the baffle plate 30 is cut in a direction that is perpendicular to the stir shaft 1 of the crumbing tank.

Figure 5:
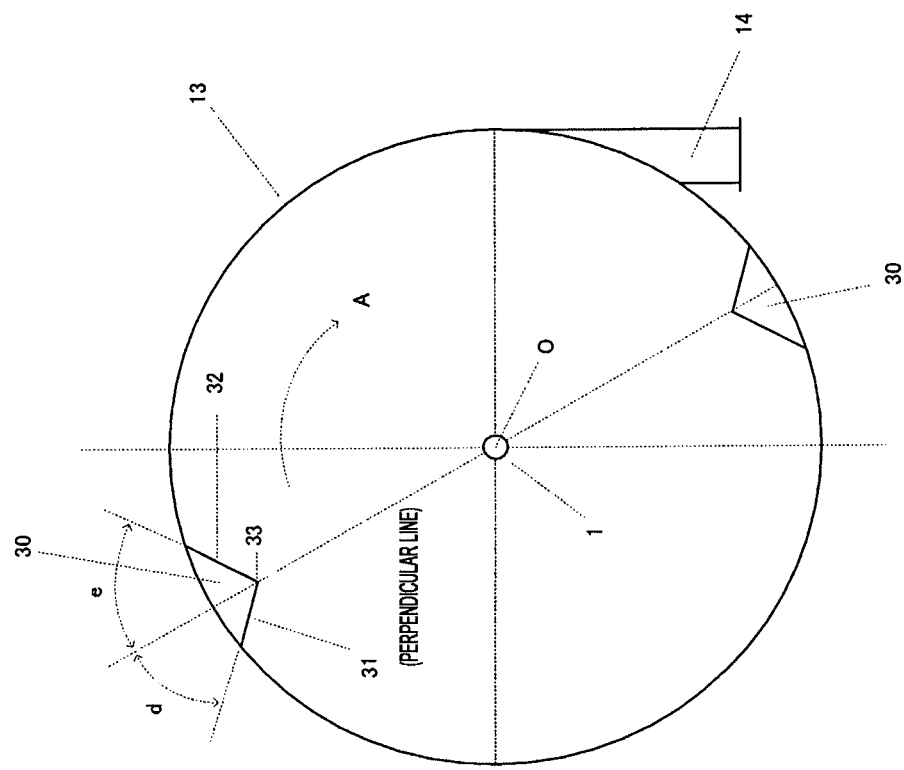
FIG. 5 shows a cross-sectional view in a cylindrical lateral direction of a crumbing tank equipped with a triangular baffle plate, and an explanatory view of angles of side faces of the triangular baffle plate.

FIG. 5 shows a cross-sectional view of the crumbing tank 13 equipped with the triangular baffle plates 30 in a direction perpendicular to the stir shaft 1, that is, a cylindrical lateral direction, and an explanatory view of side face angles of the triangular baffle plates 30.

The triangular baffle plates 30 shown in FIG. 5 each have side faces 31 and 32 on an upstream side and a downstream side, respectively, with respect to a flow direction A of fluid inside the crumbing tank 13 on a cross section in a cylindrical lateral direction of the crumbing tank 13.

The cross-sectional shape of the triangular baffle plate 30 is an approximately triangular shape in which an intersection point 33 is formed as a result of the upstream-side side face 31 and the downstream-side side face 32 of the triangular baffle plate 30 meeting. In this case, the term "approximately triangular shape" refers to a portion that corresponds to one side (base) of the triangle corresponding to a line segment of the cylindrical cross section of the crumbing tank 13, and in a strict sense refers to a curved line.

From the viewpoint of preventing the adherence of crumbs, an acute angle d formed between a line segment of the upstream-side side face 31 on the cross section of the triangular baffle plate 30 and a line segment that connects to the intersection point 33 from the center O of the stir shaft 1 is between 30 and 75 degrees, preferably is between 35 and 60 degrees, and more preferably is between 40 and 55 degrees.

From the viewpoint of preventing the adherence of crumbs, an acute angle e formed between a line segment of the downstream-side side face 32 on the cross section of the triangular baffle 30 and a line segment that connects to the intersection point 33 from the center O of the stir shaft 1 is between 30 and 75 degrees, preferably is between 45 and 70 degrees, and more preferably is between 50 and 65 degrees.

The line segment of the upstream-side side face 31 and the line segment of the downstream-side side face 32 in the cross section of the triangular baffle 30 may be curves. If the respective line segments are curves, the curve may be a circular shape or an elliptical shape that expands to the outer side. In a case where the line segment of the upstream-side side face 31 and the line segment of the downstream-side side face 32 are curves, a highest point among these line segments, that is, a highest point in the direction of the stir shaft from a side face 13, is taken as a vertex 33, an angle formed by a straight line connecting with an intersection point between the upstream-side side face 31 and the side face 13 from the vertex 33 and a line segment connecting with the intersection point 33 from the center O is taken as d and, similarly, an angle formed by a straight line connecting with an intersection point between the downstream-side side face 32 and the side face 13 from the vertex 33 and a line segment connecting with the intersection point 33 from the center O is taken as e.

Although rubber sometimes adheres to a baffle plate portion when a plate-shaped baffle plate is used in a crumbing tank, when a triangular baffle plate is used it is possible to effectively prevent the adherence of rubber, and stir can be controlled to a proper degree.

(Modification of Impeller)

In the steam stripping apparatus of the present embodiment, in a case where the liquid surface of the rubber-like polymer solution or slurry fluctuates, a configuration may be adopted in which the impeller 20 is arranged on two or more tiers on the stir shaft 1.

Further, in the present embodiment the knife blade 22 may be used in combination with an impeller that has a different thereto.

Figure 6:
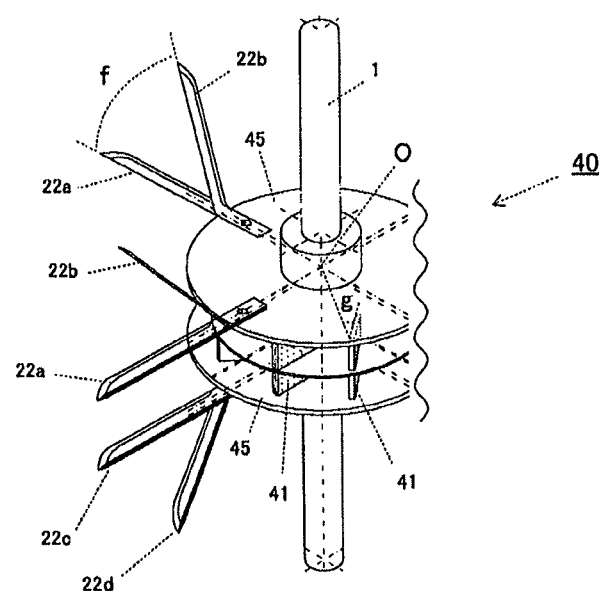
FIG. 6 shows a schematic perspective view of principal parts of one example of an impeller equipped with knife blades and turbine blades on two upper and lower tiers.

FIG. 6 shows a schematic perspective view of one example of an impeller including the knife blade 22 and a turbine blade 40.

In FIG. 6, the turbine blade 40 includes a plurality of stir vanes 41 that are sandwiched between two support plates 45 provided on the stir shaft 1, and is configured so that the stir vanes 41 are provided at a predetermined angle so as to be twisted with respect to a straight line that connects the center O of the stir shaft 1 and the inner wall of the crumbing tank.

A twist angle g of the stir vanes 41 is preferably between 10 and 50 degrees, more preferably between 15 and 45 degrees, and further preferably between 20 and 40 degrees. Thus, an outward flow can be generated, and a synergistic effect can be obtained between proper degrees of upward and downward stir and a chopping effect of the knife blades.

Further, as shown in FIG. 6, a configuration may be adopted in which the knife blades 22 include the knife blade 22a that extends in a perpendicular direction with respect to the stir shaft 1 of the crumbing tank and the knife blade 22b that extends in a diagonally upward direction with respect to the stir shaft 1, and furthermore, facing the aforementioned knife blades in the vertical direction, a knife blade 22c that extends in the horizontal direction and a knife blade 22d that extends in a diagonally downward direction.

At this time, a rising angle f of the knife blade 22b that extends in the diagonally upward direction is preferably between 80 and 30 degrees, more preferably between 70 and 40 degrees, and further preferably between 65 and 45 degrees. An angle of inclination of the knife blade 22d that extends in the diagonally downward direction can also be set in a similar numerical value range as the angle f. Thus, an effect of efficiently chopping large particle size crumbs is obtained.

{Second Aspect of Steam Stripping Apparatus}

A steam stripping apparatus according to a second aspect of the present embodiment is:

a steam stripping apparatus equipped with at least one cylindrical upright crumbing tank that desolvates a rubber-like polymer solution or slurry by means of steam, and that recovers a rubber-like polymer, in which:

at least a first tank among the crumbing tanks is equipped with a stir shaft that extends in a cylindrical upright direction and rotates in an axial direction, and an impeller that extends from a center of the stir shaft in a direction of an inner wall face of the crumbing tank;

at least the first tank among the crumbing tanks is equipped with a baffle plate arranged on an inner wall face of the crumbing tank;

the baffle plate has an approximately triangular cross-sectional shape having, on a cross section in a cylindrical lateral direction of the crumbing tank, a side face on each of an upstream side and a downstream side with respect to a flow direction of a fluid inside the crumbing tank, and in which the upstream-side side face and the downstream-side side face meet to form an intersection point;

an angle of the baffle plate that is formed by a line segment of the upstream-side side face on a cross section in a cylindrical lateral direction of the crumbing tank and a line segment that connects to the intersection point from the center of the stir shaft is between 30 and 75 degrees; and an angle of the baffle plate formed by a line segment of the downstream-side side face on a cross section in a cylindrical lateral direction of the crumbing tank and the line segment that connects to the intersection point from the center of the stir shaft is between 30 and 75 degrees.

According to the second aspect of the steam stripping apparatus, the impeller does not include a knife blade. The remaining configuration of the second aspect of the steam stripping apparatus is the same as the above described first aspect of the steam stripping apparatus.

That is, as shown in FIG. 1, the steam stripping apparatus according to the second aspect is equipped with at least one cylindrical upright crumbing tank 13 that recovers a rubber-like polymer from a rubber-like polymer solution or slurry, and includes a supply port 2 for supplying a rubber-like polymer solution or slurry into the crumbing tank 13, a steam supply port 3 that is connected to a predetermined sparger that supplies steam, and piping 4 that discharges a volatile gas that was separated from crumbs.

The steam stripping apparatus 10 according to the second aspect may be equipped with one or a plurality of the cylindrical upright crumbing tanks 13. In a case where the steam stripping apparatus 10 is equipped with a plurality of the crumbing tanks 13, at least a first tank of the plurality of the crumbing tanks 13, that is, a crumbing tank into which a rubber-like polymer solution or slurry is supplied first, is equipped with a stir shaft 1 that extends in a cylindrical upright direction and rotates in an axial direction, that is, the direction of the arrow A in FIG. 1, and an impeller 20 that extends from the center of the stir shaft 1 in the direction of the inner wall face of the crumbing tank 13.

The same configuration as that of the steam stripping apparatus according to the above described first aspect is adopted with respect to the crumbing tank, impeller, and baffle plate, and it is also possible to apply the impeller illustrated in FIG. 6.

{Steam-Stripping Finishing Method}

A steam-stripping finishing method according to the present embodiment recovers a rubber-like polymer from a rubber-like polymer solution or slurry by desolvating the rubber-like polymer solution or slurry by means of steam using the steam stripping apparatus 10 according to the present embodiment that is described above.

In the steam stripping apparatus according to present embodiment, at least a first tank among the crumbing tanks has a cylindrical shape as shown in FIG. 1, and is equipped with a stir shaft 1 that extends in a cylindrical upright direction and rotates in an axial direction, and an impeller 20 that extends from the center of the stir shaft 1 in the direction of an inner wall face of the crumbing tank 13.

Note that, as described above, according to the first aspect the impeller 20 includes the knife blade 22, while according to the second aspect the impeller 20 does not include the knife blade 22.

In the steam stripping apparatus according to the first aspect, as shown in FIG. 2, the cutting edge of each knife blade 22 is disposed facing in the rotational direction of the stir (arrow A direction), and the edge angle b shown in FIG. 3(B) has a cutting edge that is between 10 and 60 degrees. Furthermore, a ratio of a length of twice a distance between a tip of the cutting edge of the knife blade 22 and the center O of a cross section of the stir shaft with respect to the inside diameter of the crumbing tank is between 30 and 70%.

Further, in the steam stripping apparatus according to the present embodiment, at least the first tank among the crumbing tanks 13 is equipped with a baffle plate 30 arranged on an inner wall face of the crumbing tank, and the baffle plate 30 has an approximately triangular cross-sectional shape having, on a cross section in a cylindrical lateral direction of the crumbing tank 13, a side face on each of an upstream side and a downstream side with respect to a flow direction of a fluid inside the crumbing tank, in which the upstream-side side face 31 and the downstream-side side face 32 meet to form an intersection point 33.

An angle of the baffle plate 30 that is formed by a line segment of the upstream-side side face 31 on a cross section in a cylindrical lateral direction of the crumbing tank 13 and a line segment that connects to the intersection point 33 from the center O of the stir shaft is between 30 and 75 degrees.

An angle of the baffle plate 30 that is formed by a line segment of the downstream-side side face 32 on a cross section in a cylindrical lateral direction of the crumbing tank 13 and a line segment that connects to the intersection point 33 from the center O of the stir shaft is between 30 and 75 degrees.

Note that, in the steam-stripping finishing method according to the present embodiment, it is preferable that, in at least a first tank among the crumbing tanks, a stir factor that is defined by $nD^2$ is between 1 and 50.

Here, n represents the number of rotations (1/sec) of the impeller 20, and D represents the diameter (m) of the impeller. Note that the term "diameter of the impeller" refers to a length that is twice a length from the center point O of the stir shaft to the tip of a blade that is used.

(Rubber-Like Polymer Solution or Slurry)

In the steam-stripping finishing method according g to the present embodiment, a rubber-like polymer solution or slurry that is an object of a recovery process is a rubber-like polymer solution or slurry that is obtained by a solution polymerization or slurry polymerization method.

All polymers that exhibit a rubber-like form at room temperature are included as the rubber-like polymer.

A conjugated diene-based rubber-like polymer that is obtained by polymerizing or copolymerizing a conjugated diene compound or a conjugated diene compound and an vinyl aromatic compound in a hydrocarbon solvent, or a hydride thereof may be mentioned as examples of the polymers.

The rubber-like polymer may be either a random or a block copolymer, and in addition to ethylene, propylene or another α-olefin compound, also includes an olefin-based rubber-like polymer obtained by further adding a non-conjugated diene monomer for crosslinking as necessary and copolymerizing, and a butyl rubber-based polymer obtained by copolymerizing isobutene and isoprene.

These rubber-like polymers may be oil extended rubber-like polymers in which 5 to 60 parts by mass of an extender oil is mixed with 100 parts by mass of the rubber-like polymer.

The term "extender oil" refers to a synthetic oil or a mineral oil that is used for the purpose of adding flexibility to rubber.

Polybutadiene and a butadiene-styrene copolymer are preferable as the rubber-like polymer.

A substance that can be used as a solvent when polymerizing these polymers is used as a solvent that is included in the rubber-like polymer solution or slurry.

Preferably a hydrocarbon solvent is used, and saturated hydrocarbons and aromatic hydrocarbons or the like may be mentioned as examples thereof, although the hydrocarbon solvent is not limited thereto. More specifically, straight-chain and branched aliphatic hydrocarbons such as butane, pentane, hexane, pentane, and heptane; alicyclic hydrocarbons such as cyclopentane, cyclohexane, methylcyclopentane, and methylcyclohexane; and aromatic hydrocarbons such as benzene, toluene, and xylene as well as hydrocarbons containing a mixture of these may be mentioned as examples of the hydrocarbon solvent.

A solvent obtained by mixing 10 to 20 mass % of hexane in cyclohexane, or a mixed hexane obtained as a hexane fraction at a time of petroleum refining may be mentioned as more preferable examples of the solvent included in the rubber-like polymer solution or slurry.

Note that, a mixture that has normal hexane as the principal component and includes branched hydrocarbons or alicyclic hydrocarbons may be mentioned as the mixed hexane, and the component ratio will differ depending on the production region of the crude oil and the like.

It is preferable that the polymer concentration of the rubber-like polymer solution or slurry is between 10 and 50 mass %.

The steam-stripping finishing method according to the present embodiment includes a crumbing step of dispersing the above described rubber-like polymer solution or slurry in hot water to which steam has been supplied and distilling off the aforementioned solvent together with steam, and a screening step of separating and harvesting remaining polymer crumbs.

(Crumbing Step)

The crumbing step is performed using a crumbing tank constituting the steam stripping apparatus of the present embodiment that is described above.

Specifically, using the steam stripping apparatus 10 shown in FIG. 1, a rubber-like polymer solution or slurry is introduced into the crumbing tank 13 from the supply port 2, steam is fed into the crumbing tank 13 from the bottom portion thereof through the steam supply port 3, and the solvent is removed and polymer is recovered.

In order to effectively reduce the amount of solvent that remains, preferably the crumbing step is performed using a combination of two or more crumbing tanks and by means of a multistage step that includes two or more stages.

Further, as an improved method that effectively decreases the amount of residual solvent, a line crumbing method that previously mixes a rubber-like polymer solution or slurry and hot water or steam, or hot water and steam in the piping and thereafter delivers the mixture into a gaseous phase of the crumbing tank is also preferable.

Preferably, when the height of the crumbing tank 13 is taken as 100%, the liquid surface S of the rubber-like polymer solution or slurry is normally controlled to have a height corresponding to a ratio between 30 and 50% relative to the height of the crumbing tank 13.

To prevent adherence of crumbs, it is preferable to previously provide the inside of the crumbing tank 13 with a fluorocarbon resin lining or a glass lining, and it is also preferable to previously provide a mirror finish therefor.

In the steam stripping method according to the present embodiment, it is preferable to use a plurality of crumbing tanks, and it is preferable to join the crumbing tank in series with piping and, as necessary, install a pump partway along the piping so as to cause fluid including crumbs to flow through the piping.

In addition, a configuration may also be adopted in which piping is installed that allows steam to flow from a steam phase of a downstream crumbing tank to a liquid phase of an upstream crumbing tank and, as necessary, equipment that controls a pressure is provided partway along the piping.

A pressure control valve, an ejector and the like may be mentioned as equipment that controls a pressure.

When steam is fed in from the steam supply port 3 shown in FIG. 1, the steam is blown in from the bottom of each tank or from a specific tank. As necessary, the steam is blown in from a plurality of places, preferably between two and eight places, in the bottom of the relevant tank, and preferably is blown in along the rotational direction of a stirring machine with a sparger.

The sparger is a mixing apparatus having a large number of small holes that is used when mixing a gas and a liquid.

Preferably spargers are used that have between 50 and 1000 small holes per sparger, more preferably between 100 and 400 small holes per sparger, and the hole size is preferably between 2 and 20 mm, and more preferably between 4 and 10 mm. By adopting this configuration, the occurrence of blow-by and vibrations can be suppressed.

When performing the steam stripping method of the present embodiment using a plurality of crumbing tanks, crumbing tanks from the second tank onwards may have the same configuration as the crumbing tank that is the first tank or may have a different configuration to the first tank.

In general, in order to lengthen a residence time, it is preferable to make the crumbing tanks from the second tank onwards bigger than the first tank.

With respect to the temperature and pressure in the crumbing tanks during the crumbing step, it is preferable that in the first tank the liquid temperature is between 78 and 95° C. and the pressure is the atmospheric pressure or 0.05 MPa(G) or less, and in the second and subsequent tanks the liquid temperature is between 97 and 135° C. and the pressure is the atmospheric pressure or 0.21 MPa(G) or less.

A solvent that is distilled from the crumbing tank is discharged from the piping 4 shown in FIG. 1, is cooled and condensed at a heat exchanger together with steam, and recovered in a liquefied state.

According to the steam-stripping finishing method of the present embodiment, as described above, a stir factor that is defined by $nD^2$ in the first tank of the crumbing tanks is preferably between 1 and 50, and more preferably between 2 and 30.

Here, n represents the number of rotations (1/sec) of the impeller, and D represents the diameter (m) of a blade that is used. The term "diameter of a blade" used here refers to, for example in FIG. 2, twice the length from the center point O of the stir shaft 1 to the tip of the knife blade 22a.

Note that, in a case where there are multiple tiers or a plurality of blades, the term "diameter of a blade" refers to a maximum diameter of blades that are in water.

When the stir factor that is defined by $nD^2$ is within the above described range, adherence of crumbs to the wall surface of the crumbing tank and pipe blockages that are caused by adherence of crumbs to the inner wall of the pipes can be effectively prevented, and furthermore, clogging of a screen that is caused by small particle size crumbs can also be effectively prevented.

The number of rotations n of the impeller is preferably between 1 and 8 (1/sec), and more preferably is between 2 and 6 (1/sec). When the number of rotations of the impeller is within the above described range, an effective stir state is obtained and application of a stirring power can also be easily performed.

The concentration of rubber-like polymer in crumb form that is dispersed in water that is obtained in the crumbing step is generally between 0.1 to 20 mass %, preferably is 0.5 and 15 mass %, and more preferably is between 1 and 10 mass % (proportion with respect to water at a time of steam stripping). If the concentration of the rubber-like polymer is within the foregoing range, crumbs having a favorable particle size can be obtained without causing a hindrance to the operations.

It is preferable for the particle size of the crumbs to be sufficiently larger than a screen aperture in a screening step that is the next step, and to be small enough not to block the pipes. The particle size of the crumbs is preferably double or more the size of the screen aperture, and preferably is within a range of 1 to 50 mm, more preferably is between 2 and 30 mm, and further preferably is between 4 and 20 mm. Preferably, the size of 70% or more of the crumb particles is within a range of 10 to 20 mm. It is preferable that the particle sizes of the crumbs are uniform, that is, the particle size distribution is narrow. If the mean particle size is large, or even if the particle size of only a small amount of crumbs is large, for example, if crumbs of a particle size of 50 mm or more are mixed in with the crumbs, the water content will be high in a dehydration step that is a subsequent step, which is not preferable. Preferably, the mean particle size of the crumbs is between 5 and 20 mm, and more preferable between 8 and 18 mm.

(Use of Dispersing Agent)

In the steam stripping method according to the present embodiment, a small amount of dispersing agent is added that is within a range that does not adversely affect a subsequent step.

The dispersing agent is not particularly limited, and a known dispersing agent can be used.

An organic carboxylic acid, an organic polycarboxylic acid, a carboxylic acid-based polymer and a salt thereof, polyoxyalkylene derivatives, and a polyoxyalkylene alkyl ether phosphate ester and a salt thereof may be mentioned as examples of the dispersing agent.

For example, a sodium salt, a potassium salt, a lithium salt, an ammonium salt, a calcium salt, and a magnesium salt are preferably used as the salts.

With respect to the usage amount of the dispersing agent, in the case of a rubber-like polymer or a rubber-like polymer extended with oil, a mass concentration of the dispersing agent with respect to the oil extended rubber-like polymer is preferably between 0.1 and 300 ppm, and more preferably is between 30 and 150 ppm. The dispersing agent may be added to crumbing water or may be added in advance to the polymer solution.

Preferably the dispersing agent is added in a state of an aqueous solution to the hot water after crumbs were separated in a screening step that is described below.

(Screening Step)

As described above, after performing steam stripping, slurry in a state in which rubber-like polymer crumbs are dispersed in hot water is recovered from predetermined piping (piping 14 in FIG. 5) from the crumbing tank 13, and the method transitions to a screening step.

In the screening step, crumbs are separated from the slurry dispersed in the hot water using a screen having apertures of a predetermined size.

The size of the apertures of the screen is preferably between 0.5 and 5 mm, and more preferably between 1 and 3 mm. The hot water and the crumbs are separated by performing the screening step using the screen.

The screening step may be performed according to either of a shaking method and a rotary method.

The screening step according to the rotary method is also called "rotary screening", and separates crumbs and water by means of a rotating net or slits.

When implementing the screening step according to the rotary method, the number of rotations of the screen is preferably between 5 and 50 rpm (rotations/min), and a centrifugal force and gravitational force act to sift the crumbs and water that adheres to or accompanies the crumbs and thereby dehydrate the crumbs.

When implementing the screening step according to the shaking method, a screen that is used is also referred to as a shaker screen, and crumbs and water are sifted and dehydrated by shaking a net or slits. In this case, preferably the number of shakes is between 200 and 2000 cpm (cycles/min) and the amplitude is between 2 and 20 mm.

(Dehydration and Drying Step)

Because the crumbs separated by performing the screening step in the above described manner contain a large amount of moisture, the moisture is removed in a dehydration and drying step.

Specifically, the crumbs are dehydrated with a compression water squeezer such as a screw extruder-type squeezing dehydrator, and are then dried using one kind or a combination of two or more kinds of drying machine such as a screw vent extruder, an expansion-type extruder, and a hot air drying machine.

Finally, it is preferably that the water content of the crumbs is made less than or equal to 1 mass %, and more preferably less than or equal to 0.7 mass %.

EXAMPLES

The present invention is specifically described hereunder by way of specific example and comparative examples, although the present invention is not limited to the following example.

Example 1

A rubber-like polymer was recovered from a rubber-like polymer solution obtained by solution polymerization, using a steam stripping apparatus including two crumbing tanks that were connected by predetermined piping, in a configuration in which a crumbing step was performed in the order of a first tank and a second tank.

As the first tank of the crumbing tanks, a crumbing tank was used that, as shown in FIG. 1, was a cylindrical tank having an inside diameter of 2700 mm and a height of 5000 mm, and which had a tank shape having a top face portion 11 and a bottom face portion 12 that were semi-ellipsoidal end plates at the top and bottom thereof (hereunder, referred to simply as "crumbing tank").

The triangular baffle plate 30 shown in FIG. 1 was provided at two places on the inner wall of the crumbing tank.

The combined cross-sectional area of the two triangular baffle plates 30 occupied approximately 7% of the tank cross-sectional area in an aqueous phase inside the crumbing tank.

As shown in FIG. 5, each triangular baffle plate 30 had a side face 31 on an upstream side and a side face 32 on a downstream side relative to the flow direction of fluid inside the crumbing tank (arrow A direction in FIG. 5), and line segments thereof on a cross section in the cylindrical lateral direction formed an intersection point 33, with an angle d (acute angle) between the line segment of the upstream-side side face 31 and a line segment connecting to the intersection point 33 from the center O of the stir shaft on the cross section in the cylindrical lateral direction being 45 degrees and an angle e (acute angle) between the line segment of the downstream-side side face 32 and the line segment connecting to the intersection point 33 from the center O of the stir shaft being 60 degrees.

As the impeller 20, a configuration was used that, as shown in FIG. 2, included four of the paddle blades 21 that spread out radially from the stir shaft 1 as a center on one tier and that were inclined at an angle a that was set to 45 degrees relative to a horizontal cross-section perpendicular to the cylinder of the crumbing tank 13, and knife blades 22 that were provided on the faces of the paddle blades 21.

Note that, as shown in FIG. 2, two of the knife blades 22 were disposed on each of the four paddle blades 21, with the two knife blades 22 that were disposed on each paddle blade 21 being the knife blade 22a extending in the horizontal direction and the knife blade 22b extending in the diagonally upward direction.

A rising angle c of the knife blade 22b that extended in the diagonally upward direction was set to 55 degrees relative to the horizontal plane of rotation.

The length of the diameter connecting the two ends of each paddle blade 21 was a length corresponding to a ratio of 33% relative to the inside diameter of the crumbing tank 13 when taking the inside diameter as 100%.

The cutting edge of the knife blade 22 faced in the rotational direction, and an edge angle b thereof that is shown in FIG. 3(B) was 35 degrees.

The thickness of the knife blade 22 was 12 mm. The knife blade diameter connecting the two ends of the knife blade 22a had a length corresponding to a ratio of 50% relative to the inside diameter of the crumbing tank when taking the inside diameter as 100%.

Note that in the impeller 20 formed of the knife blades 22 and the paddle blades 21, the center point of the support portion 25 was arranged so that, when taking the liquid surface height as 100%, the center point of the support portion 25 was at a position at a height corresponding to a ratio of 55% relative to the liquid surface height that was a height of 800 mm from the bottom of the crumbing tank.

A tank having a cylindrical shape with an inside diameter of 4100 mm and a height 5400 mm and having semi-ellipsoidal end plates at the top and bottom was used as the second tank among the crumbing tanks.

A tabular turbine blade that did not include a knife blade and which did not itself have a knife cutting edge was used as an impeller.

The turbine blade was a tabular turbine blade without an angle of inclination (0 degrees) with respect to a straight line spreading out radially towards the inner wall of the crumbing tank from the center of the stir shaft, and which included four stir vanes arranged at regular intervals on each of two tiers (total of 8 stir vanes).

The diameter of the impeller, that is, a length that is twice a distance from the center of the stir shaft to a tip portion of the impeller, was set to a length corresponding to 37% relative to the inside diameter of the crumbing tank when taking the inside diameter as 100%.

The impeller was installed so that, when taking the liquid surface height as 100%, a center point thereof was at a position at a height of 45% relative to the liquid surface height that was a height of 1100 mm from the bottom of the tank.

A rubber-like polymer solution of SBR (styrene-butadiene resin) was obtained by solution polymerization in a stage prior to performing the crumbing step.

TDAE (treated distillate aromatic extracts) as an extender oil was added in an amount of 37.5 parts by mass based on 100 parts by mass of rubber-like polymer.

An oil-extended polymer (oil extended rubber-like polymer obtained by mixing 37.5 parts by mass of extender oil with 100 parts by mass of rubber-like polymer) that was adjusted to a concentration of 22 mass % in mixed hexane (hydrocarbons having normal hexane as a principal component that is added as a solvent together with the raw material compound at the time of solution polymerization) as a solution polymerization solvent was supplied as an oil-extended polymer to the aforementioned first tank of the crumbing tanks at a speed of 4.0 ton/h.

With respect to the operating conditions of the first tank of the crumbing tanks, steam was blown into the tank along the rotational direction using spargers arranged at four places in the bottom of the tank in a state in which the liquid temperature was 85° C., the tank pressure was atmospheric pressure, the liquid height was a height of 40% relative to the height of the crumbing tank, and the liquid was stirred at a rate of four rotations per second using the inclined paddle blades with attached knifes.

Note that spargers in which the holes were small holes of a size between 4 and 10 mm, and which had 200 holes per sparger. High-pressure steam was utilized as the steam, and was blown into the tank at a temperature between 130 and 180° C.

Further, (polyoxyalkylene alkyl ether phosphate ester salt) polyoxyethylene dodecyl ether phosphate ester calcium salt as a surfactant in an amount of 50 mass ppm based on the oil extended rubber-like polymer was added to lessen the occurrence of reaggregation of crumbs.

Most of the mixed hexane as the solvent of the rubber-like polymer solution was deaerated at the first tank of the crumbing tanks, such that a state was entered in which the rubber-like polymer in the mixed hexane was concentrated to a concentration of 90 mass % at the outlet of the first tank.

Thereafter, the concentrated rubber-like polymer was fed to the second tank of the crumbing tanks together with hot water.

Note that the deaerated solvent component was cooled and condensed at a heat exchanger together with accompanying steam, and was recovered in an amount of 99 mass % or more in a liquefied state.

A stir factor defined by $nD^2$ was 7.3 in the first tank. Here, n represents the number of rotations (1/sec) of the impeller, and D represents the diameter (m) of the impeller. Note that the term "diameter of the impeller" refers to a length that is twice the length from the center of the stir shaft to the tip of the knife blade.

In the second tank of the crumbing tank, the liquid temperature was adjusted to 117° C. and the pressure was adjusted to 0.070 MPa(G).

The liquid was stirred at the rate of 2.5 rotations per second using the inclined turbine blade as the impeller provided in the second tank that is described above and, in that state, steam was blown into the tank from spargers at four places in the bottom thereof.

In the second tank of the crumbing tanks, the mixed hexane remaining in the liquid was further deaerated, such that a state was entered in which the rubber-like polymer in the mixed hexane was concentrated to a concentration of 98 mass % or more at the outlet of the second tank.

Thereafter, the rubber-like polymer was fed together with the hot water to a screen to be used in a screening step that was the next step.

Note that the deaerated solvent component was recovered together with the accompanying steam, and was reused by being blown into the first tank from the bottom thereof.

A screen having a horizontal cylindrical shape that was made of 8-mesh (aperture of approximately 2.44 mm) wire netting formed of SUS304 steel with a diameter of 1500 mm and a copper length of 1600 mm was used as the screen.

The main body of the screen was rotated in the circumferential direction at a rate of 0.3 rotations per second, and by the centrifugal force thereof and a gravitational force, the rubber-like polymer and water that adhered to and accompanied the rubber-like polymer were sieved to perform dehydration.

The rubber-like polymer dehydrated in the above manner was further squeezed using a screw extruder-type squeezing dehydrator (Expeller manufactured by Anderson Co.), kneaded with a drying and extruding machine (Expander manufactured by Anderson Co.) and flushed from a small hole part at the tip, and finally dried with a hot air dryer (manufactured by Shinko Electric Co., Ltd.).

The dry crumbs of rubber-like polymer obtained as described above were compressed molded and finished into a rectangular product shape.

The water content of the rectangular rubbery polymer obtained in the above described manner was 0.7 mass % or less.

As a result of the operating conditions used in Example 1, comparatively large crumbs that were formed by reaggregation of crumbs were chopped into appropriate particle sizes by the knife blades and dispersed. Further, the stir state was made a uniform state in the overall tank by means of the triangular baffle plates, and as a result, trouble such as blocking of the piping by reaggregated large particle size rubber crumbs could be prevented, and crumbs did not adhere to the inner wall of the crumbing tank or to the circumference of the baffle plates.

There was also no clogging of the wire netting of the screen used in the screening step.

Comparative Example 1

A baffle plate was not provided on the inner wall of the first tank of the crumbing tanks.

Further, with respect to the impeller, similarly to the above described {Example 1}, a configuration was used that included four inclined paddle blades on a single tier, with the paddle blades being inclined at an angle that was set at 45 degrees relative to a horizontal cross-section perpendicular to the cylinder of the crumbing tank, in which the diameter connecting both ends of the respective paddle blades was a length corresponding to a ratio of 33% relative to the inside diameter of the crumbing tank when taking the inside diameter as 100%. Note that knife blades were not disposed on the paddle blades.

A steam stripping step was performed in a state in which the liquid was stirred at a rate of four rotations per second using the inclined paddle blades, with the other conditions being the same as in the above described Example 1.

In Comparative Example 1, in addition to the fact that an upward and downward flow in the aqueous phase was not generated by baffle plates in the first tank and the mixed state was poor, since there was no effect of dispersing crumbs by means of knife blades, a large number of large particle size crumbs were formed by reaggregation of crumbs inside the first tank.

As a result, blockages frequently occurred in a slurry piping portion before the screen, and hence a stable steam stripping step could not be continued.

Comparative Example 2

As the first tank of the crumbing tanks, a tank was used that had four tabular baffle plates on the inner wall of the crumbing tank. The four tabular baffle plates occupied a cross-sectional area of approximately 25% relative to the cross-sectional area of an aqueous phase part in the tank.

The tabular baffle plates were provided at an inclination of 90 on the upstream side and downstream side with respect to the flow direction of fluid in the crumbing tank.

Further, as the impeller, similarly to the above described {Example 1}, a configuration was used that included four inclined paddle blades on a single tier, with the paddle blades being inclined at an angle that was set at 45 degrees relative to a horizontal cross-section perpendicular to the cylinder of the crumbing tank. A diameter connecting both ends of the respective paddle blades had a length corresponding to a ratio of 50% relative to the inside diameter of the crumbing tank when taking the inside diameter as 100%. Note that knife blades were not disposed on the paddle blades.

A steam stripping step was performed in a state in which the liquid was stirred at a rate of six rotations per second using the inclined paddle blades, with the other conditions being the same as in the above described Example 1.

In Comparative Example 2, although large crumbs were not generated inside the crumbing tank, adherence of crumbs occurred mainly on the upstream side and downstream side of the tabular baffle plates. Further, since clogging of the wire netting of the screen occurred in the next step, stable steam stripping step could not be continued.

Comparative Example 3

In the first tank of the crumbing tanks, baffle plates were not provided on the inner wall of the tank.

The same configuration as in the above described Example 1 was adopted for the remaining configuration, and steam stripping of rubber-like polymer was performed.

Although large crumbs were not generated inside the crumbing tank, an upward and downward flow in the aqueous phase was not generated by baffle plates in the first tank and the mixed state was poor, crumbs collided with knife blades and large vibrations frequently occurred, and knives broke and it was difficult to perform operation over a long period of time.

Further, the particle size of crumbs was on average 1.5 times larger than in Example 1, and the water content of crumbs was 5% higher in the next step in which the crumbs were processed using the screw extruder type squeezing dehydrator.

In Example 1, by using the triangular baffle plates, the stir state of fluid inside the crumbing tanks could be uniformly controlled overall, and the adherence of rubber was effectively prevented and stir could be appropriately controlled. Further, an effect of breaking comparatively large crumbs was obtained by means of the knife blades, and since large particle size crumbs were not generated and the crumbs were a suitable particle size, screen clogging did not occur in the next step, and there was no adherence of crumbs to the inner wall of the crumbing tank or baffle plates, and stable production could be performed in a favorable manner.

In contrast, in Comparative Example 1, because knife blades were not provided, large particle size crumbs that were generated grew without being dispersed, blockage problems occurred, and stable production of crumbs could not be performed.

In Comparative Example 2, although generation of large particle size crumbs was suppressed by making the diameter of paddle blades of the crumbing tank that was the first tank a large size and also increasing the stir effect by raising the number of stir rotations and using tabular baffle plates, it was not possible to make the overall stir state inside the crumbing tank uniform as in the case of the triangular baffle plates. Consequently, crumbs of a very small particle size were generated, and screen clogging occurred in the next step, and furthermore, stagnation portions where the flow stagnated arose at the front and rear of the tabular baffle plates and hence the adherence of crumbs arose, and thus stable production of crumbs could not be performed.

In comparative example 3, although knife blades were used, because the triangular baffle plates were not provided, the stir state inside the crumbing tank was unsuitable and consequently crumbs accumulated in the vicinity of the fluid surface which in turn applied a load to the knife blades and caused the knife blades to break. Further, the particle size of the crumbs was large.

INDUSTRIAL APPLICABILITY

The steam-stripping finishing method for rubber-like polymer according to the present invention is industrially applicable as a method of manufacturing rubber-like polymer composed of a rubber composition that is favorable for use as rubber for tires, anti-vibration rubber and footwear.

REFERENCE SIGNS LIST

1 Stir shaft
2 Supply port
3 Steam supply port
4 Piping
10 Steam stripping apparatus
11 Top face portion
12 Bottom face portion
13 Crumbing tank
14 Piping
20 Impeller
21 Paddle blade
22 Knife blade
22a Knife blade that extends in horizontal direction relative to plane of rotation
22b Knife blade that extends in diagonally upward direction relative to plane of rotation
22c Knife blade that extends in horizontal direction relative to plane of rotation
22d Knife blade that extends in diagonally downward direction relative to plane of rotation
25 Support portion
26 Attachment member
30 Baffle plate (triangular baffle plate)
31 Upstream-side side face of triangular baffle plate
32 Downstream-side side face of triangular baffle plate
33 Intersection point between cross-sectional line segments of upstream-side side face and downstream-side side face
40 Turbine blade
41 Stir vane
45 Support plate

The invention claimed is:

1. A steam stripping apparatus comprising:
   at least one cylindrical upright crumbing tank which recovers a rubbery polymer from a solution containing the rubbery polymer by means of steam;
   a stir shaft, inside the crumbing tank, which extends in a cylindrical upright direction, and which rotates in an axial direction;
   an impeller that extends from a center of the stir shaft in a direction of an inner wall face of the crumbing tank;
   a knife blade mounted on the impeller, wherein the knife blade has a cutting edge with an edge angle between 10 and 60 degrees that faces in a rotational direction of the stir; and
   a baffle plate arranged on an inner wall face of the crumbing tank;
   wherein the baffle plate has an approximately triangular cross-sectional area having, on a cross section in a cylindrical lateral direction of the crumbing tank, an upstream side and a downstream side with respect to a flow direction of a fluid inside the crumbing tank, and in which the upstream side and the downstream side meet to form an intersection point;
   an angle of the baffle plate that is formed by a line segment of the upstream side on the cross section in the cylindrical lateral direction of the crumbing tank and a line segment that connects to the intersection point from the center of the stir shaft is between 30 and 75 degrees;
   an angle of the baffle plate formed by a line segment of the downstream side on the cross section in the cylindrical lateral direction of the crumbing tank and the line segment that connects to the intersection point from the center of the stir shaft is between 30 and 75 degrees; and
   the crumbing tank includes a steam supply port at a bottom portion thereof to feed the steam into the crumbing tank.

2. The steam stripping apparatus according to claim 1, wherein the cross-sectional area of the baffle plate is between 1 and 20% relative to a cross-sectional area of the crumbing tank.

3. The steam stripping apparatus according to claim 2, wherein the cross-sectional area of the crumbing tank is a sum total of cross-sectional areas of the stir shaft, the impeller and the baffle plate.

4. The steam stripping apparatus according to claim 1, wherein:
   the crumbing tank has an inside diameter;
   a distance exists between a tip of the cutting edge of the knife blade and a center of a cross section of the stir shaft that is on a same plane as the knife blade;
   a ratio of twice the distance to the inside diameter is between 30 and 70%.

5. A steam stripping apparatus comprising:
   at least one cylindrical upright crumbing tank which recovers a rubbery polymer from a solution containing the rubbery polymer by means of steam;
   a stir shaft, inside the crumbing tank, which extends in a cylindrical upright direction, and which rotates in an axial direction;
   an impeller that extends from a center of the stir shaft in a direction of an inner wall face of the crumbing tank; and
   a baffle plate arranged on an inner wall face of the crumbing tank; wherein
   the baffle plate has an approximately triangular cross-sectional area having, on a cross section in a cylindrical lateral direction of the crumbing tank, an upstream side and a downstream side with respect to a flow direction of a fluid inside the crumbing tank, and in which the upstream side and the downstream side meet to form an intersection point;
   an angle of the baffle plate that is formed by a line segment of the upstream side on the cross section in the cylindrical lateral direction of the crumbing tank and a line segment that connects to the intersection point from the center of the stir shaft is between 30 and 75 degrees;
   an angle of the baffle plate formed by a line segment of the downstream side on the cross section in the cylindrical lateral direction of the crumbing tank and the line segment that connects to the intersection point from the center of the stir shaft is between 30 and 75 degrees; and the crumbing tank includes a steam supply port at a bottom portion thereof to feed the steam into the crumbing tank.

6. The steam stripping apparatus according to claim 5, wherein the cross-sectional area of the baffle plate is between 1 and 20% relative to a cross-sectional area of the crumbing tank.

7. The steam stripping apparatus according to claim 6, wherein the cross-sectional area of the crumbing tank is a sum total of cross-sectional areas of the stir shaft, the impeller and the baffle plate.

8. A steam stripping apparatus comprising:
 at least one cylindrical upright crumbing tank which recovers a rubbery polymer from a slurry containing the rubbery polymer by means of steam;
 a stir shaft, inside the crumbing tank, which extends in a cylindrical upright direction, and which rotates in an axial direction;
 an impeller that extends from a center of the stir shaft in a direction of an inner wall face of the crumbing tank;
 a knife blade mounted on the impeller, wherein the knife blade has a cutting edge with an edge angle between 10 and 60 degrees that faces in a rotational direction of the stir; and
 a baffle plate arranged on an inner wall face of the crumbing tank;
 wherein the baffle plate has an approximately triangular cross-sectional area having, on a cross section in a cylindrical lateral direction of the crumbing tank, an upstream side and a downstream side with respect to a flow direction of a fluid inside the crumbing tank, and in which the upstream side and the downstream side meet to form an intersection point;
 an angle of the baffle plate that is formed by a line segment of the upstream side on the cross section in the cylindrical lateral direction of the crumbing tank and a line segment that connects to the intersection point from the center of the stir shaft is between 30 and 75 degrees;
 an angle of the baffle plate formed by a line segment of the downstream side on the cross section in the cylindrical lateral direction of the crumbing tank and the line segment that connects to the intersection point from the center of the stir shaft is between 30 and 75 degrees; and
 the crumbing tank includes a steam supply port at a bottom portion thereof to feed the steam into the crumbing tank.

* * * * *